US011919230B2

(12) United States Patent
Enslow et al.

(10) Patent No.: US 11,919,230 B2
(45) Date of Patent: Mar. 5, 2024

(54) THREE-DIMENSIONAL PRINTING SYSTEM THROUGHPUT IMPROVEMENT BY SENSING VOLUME COMPENSATOR MOTION

(71) Applicant: 3D Systems, Inc., Rock Hill, SC (US)

(72) Inventors: Andrew Enslow, Escondido, CA (US); Eric M. Innes, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 183 days.

(21) Appl. No.: 17/228,876

(22) Filed: Apr. 13, 2021

(65) Prior Publication Data
US 2021/0323225 A1   Oct. 21, 2021

Related U.S. Application Data

(60) Provisional application No. 63/011,073, filed on Apr. 16, 2020.

(51) Int. Cl.
| | |
|---|---|
| *B29C 64/135* | (2017.01) |
| *B29C 64/232* | (2017.01) |
| *B29C 64/245* | (2017.01) |
| *B29C 64/268* | (2017.01) |
| *B29C 64/286* | (2017.01) |
| *B29C 64/393* | (2017.01) |
| *B29C 64/40*  | (2017.01) |

(Continued)

(52) U.S. Cl.
CPC .......... *B29C 64/135* (2017.08); *B29C 64/232* (2017.08); *B29C 64/245* (2017.08); *B29C 64/268* (2017.08); *B29C 64/286* (2017.08); *B29C 64/393* (2017.08); *B29C 64/40* (2017.08); *B33Y 10/00* (2014.12); *B33Y 30/00* (2014.12); *B33Y 50/02* (2014.12)

(58) Field of Classification Search
CPC ... B29C 64/135; B29C 64/232; B29C 64/245; B29C 64/268; B29C 64/286; B29C 64/393; B29C 64/40; B33Y 10/00; B33Y 30/00; B33Y 50/02
See application file for complete search history.

(56) References Cited

U.S. PATENT DOCUMENTS

| | | | |
|---|---|---|---|
| 5,174,931 A | * 12/1992 | Almquist | ................. G05D 9/12 |
| | | | 118/712 |
| 2014/0358273 A1 | * 12/2014 | LaBossiere | ........... B29C 64/118 |
| | | | 700/119 |
| 2016/0311024 A1 | * 10/2016 | Thiel | ........................ B22F 5/00 |

FOREIGN PATENT DOCUMENTS

CN    109367016 A * 2/2019 ........... B29C 64/106

* cited by examiner

*Primary Examiner* — Seyed Masoud Malekzadeh
*Assistant Examiner* — Xinwen Ye

(57) ABSTRACT

A three-dimensional (3D) printing system includes a resin vessel containing photocurable resin, an imaging system, a build plate with a plate upper surface, a vertical positioner, a volume compensator (VC), and a controller. The controller is configured to: (a) operate the VC to maintain a resin upper surface proximate to a build plane, (b) operate the imaging system and the vertical positioner to generate a plurality of base layers upon the plate upper surface, (c) receive a first signal responsive to vertical motion of the resin upper surface, (d) analyze the first signal to determine a metric that is related to an extent of immersion of the plate upper surface below the resin upper surface during formation of the base layers, and (e) operate the imaging system and the vertical positioner to begin generation of the 3D article after the metric has reached a predefined threshold.

21 Claims, 8 Drawing Sheets

(51) Int. Cl.
*B33Y 10/00* (2015.01)
*B33Y 30/00* (2015.01)
*B33Y 50/02* (2015.01)

THREE-DIMENSIONAL PRINTING SYSTEM THROUGHPUT IMPROVEMENT BY SENSING VOLUME COMPENSATOR MOTION

This non-provisional patent application claims priority to U.S. Provisional Application Ser. No. 63/011,073, Entitled "Three-Dimensional Printing System Throughput Improvement by Sensing Volume Compensator Motion" by Andrew Enslow et al., filed on Apr. 16, 2020, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a build material. More particularly, the present disclosure concerns a way of minimizing a time to start fabrication of a 3D article by analyzing a signal related to a motion of a compensation volume for maintaining a resin level.

BACKGROUND 3D printing systems are in wide use for prototyping and manufacturing articles. One type of 3D printing system utilizes a process called stereolithography. A typical stereolithography utilizes a resin vessel, an imaging system, and a build plate within liquid resin held by the resin vessel. An article is manufactured in a layer-by-layer manner by selectively imaging and solidifying layers of the resin over the build plate. One challenge is that the build plate may not be perfectly parallel to an upper surface of the resin. This can result in a defective article if imaging of the article is attempted on a non-parallel or non-level surface.

BRIEF DESCRIPTION OF THE FIGURES

FIG. 6B differs from 6A in that the compensation volume only moves after the build plate is positioned for another layer (it does not include an effect of up and down motion of the build plate).

SUMMARY

Figure 1:
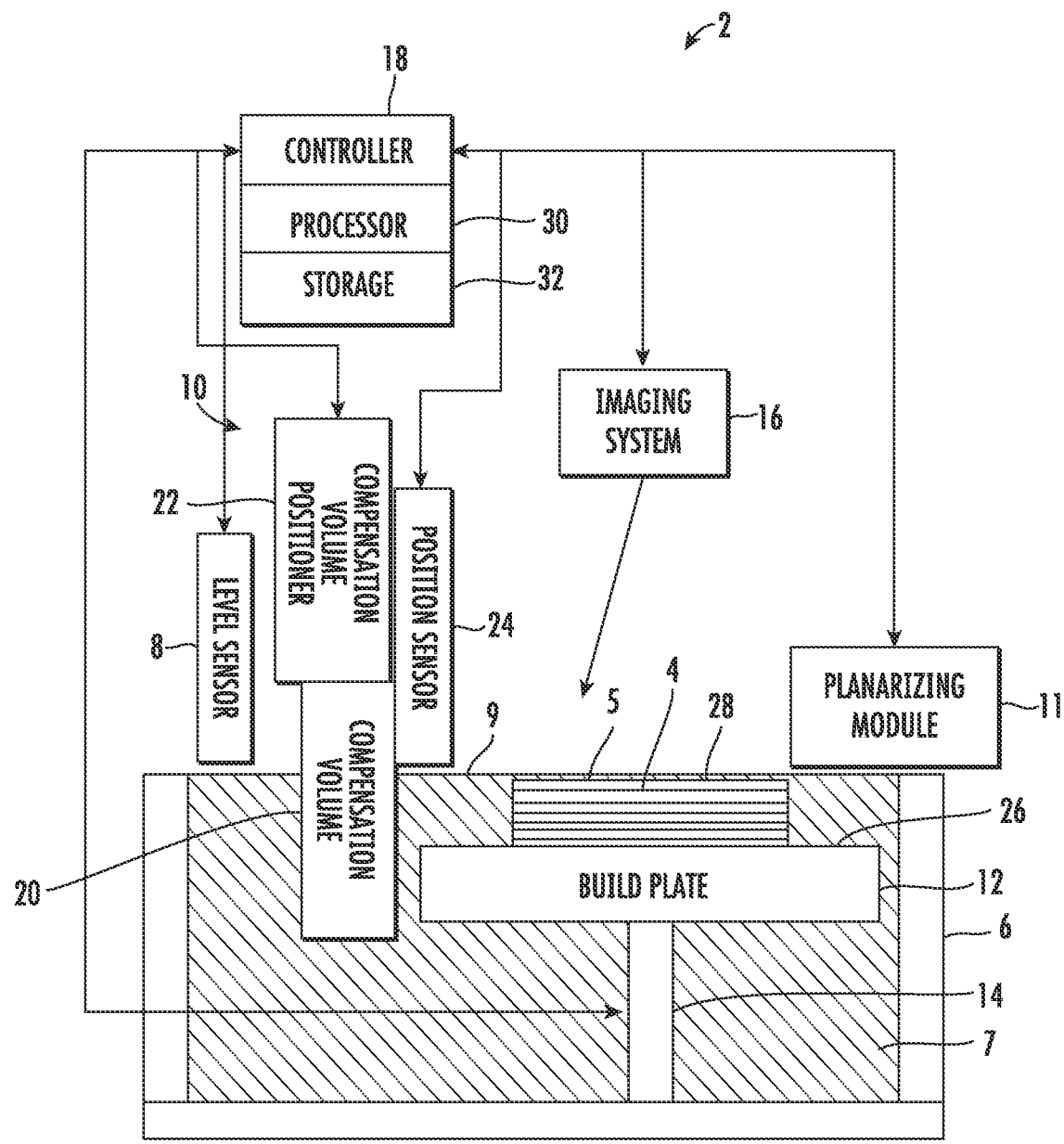
FIG. 1 is a block diagram of a three-dimensional (3D) printing system for fabricating or manufacturing a three-dimensional (3D) article.

In a first aspect of the disclosure, a three-dimensional (3D) printing system for manufacturing a three-dimensional (3D) article includes a resin vessel, an imaging system, a build plate, a vertical positioner, a resin level sensor, a volume compensator (VC), and a controller. The resin vessel is for containing a volume of photocurable resin having a resin upper surface. The imaging system is configured to define a build plane (BP) which defines a height (in Z) and a lateral extent (in X and Y) of a selectively cured layer of resin. The build plate has a plate upper surface.

The controller is configured to: (a) operate the VC to maintain the resin upper surface proximate to the build plate to within a specified tolerance range, (b) operate the imaging system and the vertical positioner to generate a plurality of base layers upon the plate upper surface, (c) receive a first signal responsive to vertical motion of the resin upper surface, (d) analyze the first signal to determine a metric that is related to an extent of immersion of the plate upper surface below the resin upper surface during formation of the base layers, and (e) operate the imaging system and the vertical positioner to begin generation of the 3D article after the metric has reached a predefined threshold. The controller can be further configured to generate frangible features that allow physical breakage between the 3D article and the base layers. The controller can be yet further configured to generate a support scaffold that couples the frangible features to the base layers. The metric can be a slope of a curve which has an ordinate (Y-value) versus an abscissa (X-value). The curve can have an abscissa that is proportional to or equal to a number of base layers that have been formed. The ordinate can be proportional to or equal to an amount of resin displaced by the build plate as it is lowered incrementally for each new base layer to be polymerized. The controller can end forming base layers and start forming the 3D article based upon the metric or slope being less than a predetermined value or threshold. Once the slope or metric is less than the threshold, the controller can form a predetermined or computed number M of base layers before beginning to form layers of the 3D article.

The base layers provide a level horizontal surface upon which the 3D article can be fabricated. When the metric or slope is less than a certain threshold, that indicates that the surface is level enough or that the predetermined number M of additional base layers are sufficient to provide a level surface.

Regarding step (d) of analyzing the signal above, metric is related to a degree to which the base layers laterally extend over the plate upper surface. Step (d) minimizes the number of base layers required for providing a horizontal surface upon which to fabricate the 3D article.

In one implementation the VC includes a compensation volume (CV), a compensation volume positioner (CVP), and a compensation volume position sensor (CVPS) that outputs a position signal indicative of a vertical position of the CVP. The first signal is the position signal from the CVPS. The metric can be a slope of a curve of the vertical position of the CV versus layer. Generation of the 3D article can begin after the slope is below a certain threshold. For this metric, the abscissa can be proportional to or equal to a number of base layers formed. The ordinate can be proportional to or equal to a vertical position of the CV. Once the metric or slope is below the threshold, then M additional base layers are fabricated before beginning fabrication of the 3D article.

In some implementations, the plate upper surface has a lateral dimension in X and/or Y of at least 400 millimeters. In some embodiments, the lateral dimensions can be 500 millimeters or more, 600 millimeters or more, or 700 millimeters or more. A first specific implementation is a rectangular plate upper surface having lateral dimensions of 725 millimeters in X and 675 millimeters in Y. A second specific implementation is a square plate upper surface having lateral dimensions of 725 millimeters in X and 725 millimeters in Y. These implementations are specific examples as the lateral dimensions of the plate upper surface can vary and can be larger or smaller than these examples. Yet further implementations can have other geometries such as polygonal, circular, or irregular. An important factor is that forming excess base layers on large area build plates can be costly in terms of material and process time. Moreover, large build plates can vary widely in terms of a magnitude of curvature and/or non-planarity.

The plate upper surface is ideally planar and parallel to the build plane 28. However, the plate upper surface can have an imperfect orientation (tilted or not level) and/or can have some curvature. The non-planar nature or tilted nature of the plate upper surface can be characterized as a height range H. H can also be defined over the lateral extent of the build plane 28 or the 3D article to be manufactured. H can have values from 1 millimeter to 10 millimeters or 1.5 millimeter to 6 millimeters or other ranges. A single layer thickness of a polymer layer to be fabricated is defined as the variable t. The magnitude of t can be about 100 microns or 0.1 millimeter thick. A value N is the minimum number of layers required to planarize a plate upper surface. Thus N time t is equal to H. This means that N can range from 10 to 100 layers for values of H from 1 mm to 10 mm when t equals 100 microns. Other values of t are possible. These are but examples to illustrate possible magnitudes of various values of H and t.

A vertical position of the resin upper surface needs to be maintained within a specified tolerance range of the build plane. Preferably the tolerance range is plus or minus one micron. For some systems plus or minus two microns or plus or minus five microns may be accurate enough. The tolerance range of the resin upper surface vertical position correlates with a dimensional uncertainty of a 3D article.

In a some implementations, a portion of the scaffold is formed concurrently with forming the base layers. In preferred implementations, the scaffold includes the frangible features that allow physical (bending, pulling) separation between the 3D article and the base layers. The frangible features can be a narrowed tapered portion of the scaffold that interfaces with the 3D article at its narrowest tip. Ideally, frangible connections with tapering and narrowed tips minimizes the force required for separation and an amount of residual material left on the 3D article after the separation.

The 3D article is initially defined by a CAD (computer aided design) file which defines a virtual 3D body. The virtual 3D body is the desired product from a 3D manufacturing process provided by the 3D printing system. When the virtual 3D body is first conceived, the scaffold, frangible features, and the base layers are not yet defined. The 3D body is loaded up by the controller. The controller is configured to then define the scaffold based upon geometric and physical support requirements of the 3D body. This definition can be performed automatically or may include manual inputs to define the scaffold. In previous embodiments, the base layers are defined before a fabrication process begins. But in order to account for geometric tolerances of the build plate in relation to the resin upper surface, a large number of base layers are required to be certain that the 3D article is fabricated upon a flat, level base. The method as described above and below defines the base layers in real time so as to provide a flat surface while minimizing the number of base layers required. The controller can be a single computer module or it can includes a number of computer modules. When the controller includes a number of computer modules they can be electrically, wirelessly, and/or network (e.g., Internet) coupled.

DETAILED DESCRIPTION OF THE PREFERRED EMBODIMENTS

FIG. 1 is a schematic diagram of a three-dimensional printing system 2 for fabricating a three-dimensional article or object 4 in a layer-by-layer manner. Not shown are polymer layers deposited prior to forming article 4. An upper surface of any of these polymer layers prior to formation of another polymer layer is referred to as element 5. In describing system 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances. For example, "generally equal" means that a design goal is equality but may vary according to manufacturing tolerances and other factors such as a placement location.

System 2 includes a resin vessel 6 containing photocurable resin 7, a resin level sensor 8, a volume compensator (VC) 10, a planarizing module 11, a build plate 12 coupled to a vertical positioner 14, and imaging system 16 some of which are electrically or wirelessly coupled to controller 18. In the illustrated embodiment, the volume compensator (VC) 10 includes a compensation volume (CV) 20, a compensation volume positioner (CVP) 22, and a compensation volume position sensor (CVPS) 24. In an alternative embodiment, a volume compensator may include a pump or other device for maintaining vertical position of a resin upper surface 9.

The resin level sensor 8 is configured to output a signal or data indicative of a position of a resin upper surface 9 which is the upper surface of the photocurable resin 7 that is in contact with a gaseous environment such as the atmosphere or a controlled gaseous atmosphere such as nitrogen. The resin level sensor 8 can sense the vertical position of the resin upper surface 9 position optically, acoustically, or in conventional ways for sensing a position of a resin fluid/air interface.

The volume compensator (VC) 10 is configured to maintain the resin upper surface 9 at a specified vertical position within a vertical tolerance range. Ideally the resin upper surface 9 would be coincident with a build plane 28. In the illustrated embodiment, the compensation volume (CV) 20 resides partly within the photocurable resin 7 and extends partly above the resin upper surface 9. The CV 20 can include a metal weight surrounded by an inert polymer shell. The compensation volume positioner (CVP) 22 is configured to controllably move the CV 20 up and down to maintain the resin upper surface 9 at the build plane 28 to within the vertical tolerance range. The CVP 22 can include a motorized pulley that raises and lowers a cable that is attached to the CV 20. The compensation volume position sensor (CVPS) 24 outputs a signal that is indicative of the vertical position of the CV 20.

The build plate 12 has a plate upper surface 26 for supporting the three-dimensional article 4. The illustrated embodiment depicts the plate upper surface 26 as being generally parallel with the upper surface of the resin 7 (roughly horizontal). In practice, the upper surface 26 isn't exactly parallel due to mechanical tolerances. The upper surface 26 can have a very large surface area and the lack of parallelism can have substantial implications as will become apparent. The vertical positioner 14 is configured to controllably and vertically position the upper surface 26 (or later, upper surface 5). The vertical positioner 14 can include a motorized cylinder. In one embodiment, the motorized cylinder includes a lead screw and threaded bearing. Motorized rotation of the lead screw under control of controller 18 can be used to raise and lower the build plate 12.

The planarizing module 11 can be a roller, wiper, or other device for passing across the surface 26 to provide uniform coatings of resin over the build plate 12. The planarizing module 11 can include a motorized transport such as a combination of a motor, a pulley, and a belt. Motor rotation then imparts translation of the roller, wiper, or other device along lateral axis Y as it passes defines build plane 28.

The build plate 12 can have various shapes and dimensions. In some embodiments the plate upper surface 26 can have lateral dimensions of 400 millimeters or more. In some embodiments, the lateral dimensions can be 500 millimeters or more, 600 millimeters or more, or 700 millimeters or more. In one illustrative embodiment, the build plate 12 is square and has dimensions of 725 millimeters in X and 725 millimeters in Y. Other build plates 12 can be square, rectangular, circular, oval, polygonal, irregular, or have other shapes.

The imaging system 16 is configured to selectively apply radiation to the build plane 28 above the build plate 12. The application of the radiation to the build plane 28 results in a selective solidification of resin 7 onto a surface above the plate upper surface 26. In one embodiment the imaging system 16 includes a laser and scanning mirror system. The build plane 28 ideally coincides with the resin upper surface 9 and an upper surface of a layer of resin that has just been dispensed upon surface 26 or 5. The build plane 28 is defined by a fixed vertical height and effective lateral limits of the imaging system 16 at that fixed vertical height.

The controller 18 includes a processor 30 coupled to an information storage device 32. The information storage device 32 stores software instructions that, when executed by the processor, control or receive information from resin fluid level sensor 8, the VC 10 (including the CVP 22 and the CVPS 24), the vertical positioner 14, the imaging system 16, and other portions of system 2. Thus, the controller 18 is configured to operate various portions of system 2. Controller 18 can be located at a single location in system 2 or be distributed among multiple locations.

To maintain the vertical position of the resin upper surface 9, the controller 18 continuously monitors and analyzes the signal from the resin level sensor 8 and operates the CVP 22 to maintain the vertical position of the resin upper surface 9 to within the vertical tolerance range. The build plane 28 is generally the same as the resin upper surface 9 and a focus of imaging system 16. Thus, it is important to accurately maintain the vertical position of the resin upper surface 9 during process of solidifying layers of photocurable resin 7.

Figure 2:
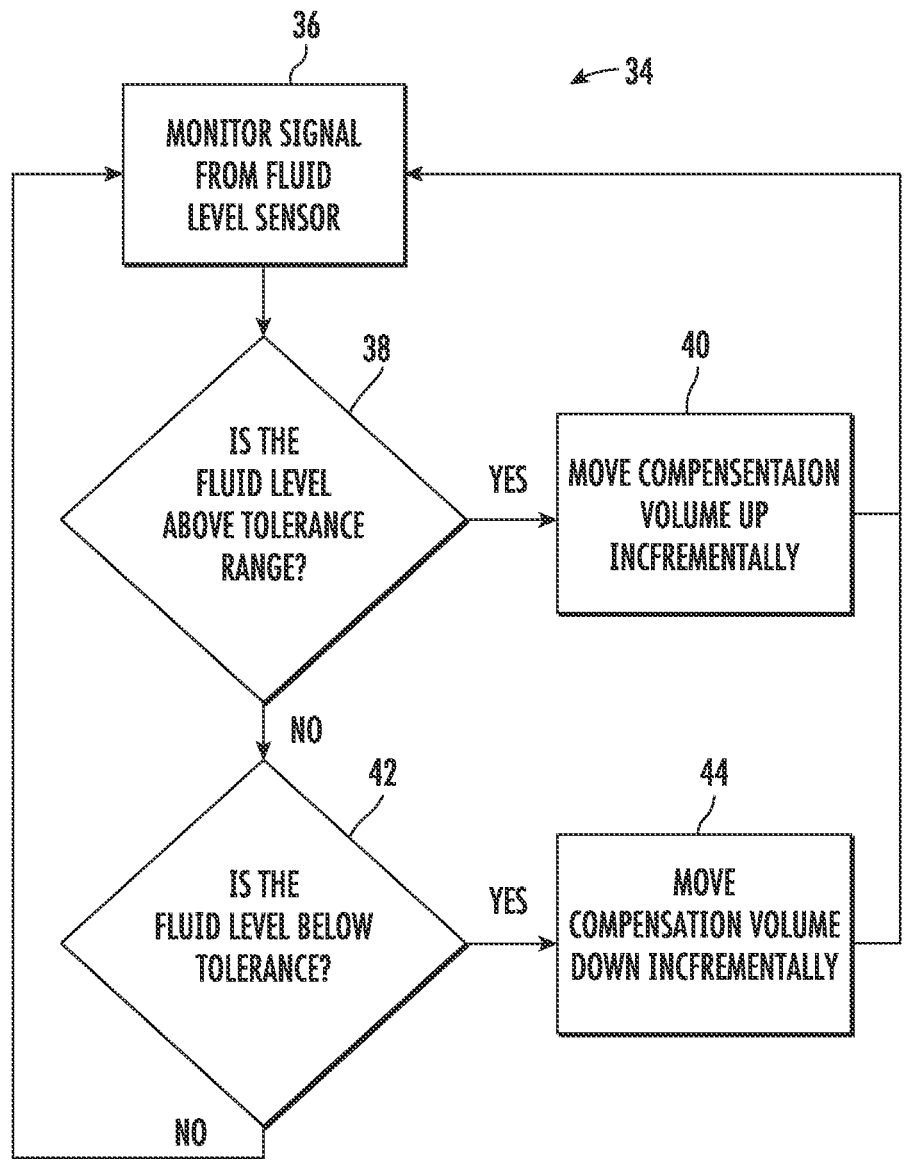
FIG. 2 is a flowchart depicting an embodiment of a method performed by a controller for maintaining a resin level within a tolerance range of a specified level. The specified level is based upon a build plane and is generally coincident with the build plane to within a specified tolerance.

FIG. 2 is an embodiment of a method 34 performed by controller 18 for maintaining the resin upper surface 9 to within the vertical tolerance range of the build plane 28. According to 36, controller 18 receives a signal from the resin level sensor 8. According to 36 also, the controller 18 analyzes the signal to determine if the resin upper surface 9 is above or below the vertical tolerance range. If, according to 38, the resin upper surface 9 is above the vertical tolerance range, then the controller 18 operates the CVP 22 to incrementally raise the CV 20 according to 40. As the CV 20 is raised, the result is that the resin upper surface 9 is lowered toward or into the vertical tolerance range. After step 40, the process loops to step 36.

If according to 42, the resin upper surface 9 is below the vertical tolerance range, then the controller 18 operates the CVP 22 to incrementally lower the CV 20 according to 44. As the CV 20 is lowered, the resin upper surface 9 is raised toward or into the vertical tolerance range. After step 44, the process loops back to step 36. In some embodiments, the controller 18 is configured to continuously perform method 34 to maintain the resin upper surface 9 within the vertical tolerance range about the build plane 28.

In certain embodiments, the resin upper surface 9 is maintained within a tolerance range of less than plus or minus 10 microns (1 micron=$10^{-6}$ meters) of the build plane 28. Preferably the resin upper surface 9 is maintained within a tolerance range of plus or minus five microns of the build plane 28 or plus or minus two microns of the build plane 28 or even plus or minus one micron of the build plane 28. Whether 1 micron, two microns, 5 microns, 10 microns, 20 microns, or some other magnitude, the magnitude of the vertical tolerance range is at least partly dependent upon desired geometric accuracy for the 3D article 4.

Figure 3:
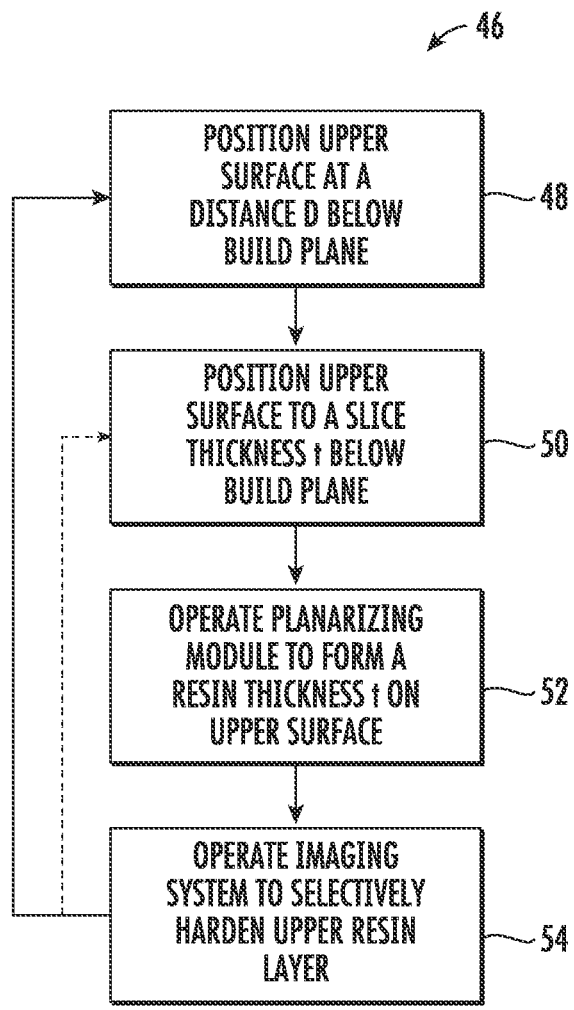
FIG. 3 is a flowchart depicting an embodiment of a method of forming an object upon an upper surface of a build plate. The object includes base layers, a scaffold structure, and a three dimensional (3D) article of manufacture. The 3D article of manufacture is the desired product produced by the method.

FIG. 3 is an embodiment of a method 46 for selectively imaging and solidifying layers of the photocurable resin 7 over the build plate 12 to form a desired structure including article 4. Controller 18 is also configured to operate portions of system 2 to perform the method 34 (FIG. 2) while performing steps of method 46. In some embodiments, the method 34 is performed each time a layer of article 4 is imaged. In other embodiments, method 34 is performed continuously.

According to 48, the vertical positioner 14 is operated to position the plate upper surface 26 of the build plate 12 or the upper surface 5 of cured resin 7 a distance D below the build plane 28. If t is a slice thickness—about the thickness of one layer of selectively cured resin, then D is typically two or more times t in order to accelerate a flow or resin over the upper surface 26 or 5.

According to 50, the vertical positioner 14 is operated to raise or position the upper surface (of resin or build plate 12) to a distance t below the build plane 28. Immediately after step 50, a layer of resin is over surface 26 or 5 that is greater than t due to surface tension and viscosity effects. According to 52, the planarizing module 11 is operated to reduce the resin thickness over upper surface 26 or 5 to approximately the thickness t. After step 52, an upper surface of the planarized layer of resin 7 is generally at the build plane 28.

According to 54, the imaging system 16 is operated to selectively cure the planarized layer of resin. The process then loops back to step 48. After a certain number of layers are formed, step 48 may be skipped (in some embodiments) and the build plate lowered by a thickness t after each layer of resin is imaged (as indicated by the dashed line).

Figure 4:
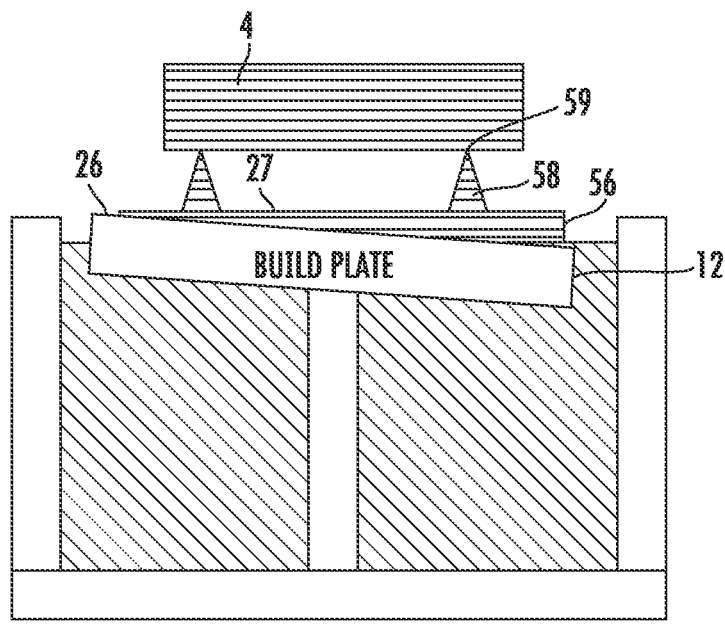
FIG. 4 is a schematic diagram illustrating a resin vessel containing resin, a build plate, and a fabricated object upon an upper surface of the build plate. The fabricated object includes base layers, a scaffold, and an article. The article is the intended product.

As depicted in FIG. 4, the upper surface 26 of the build plate 12 is not perfectly horizontal. Although FIG. 4 is exaggerated, the upper surface 26 defines an oblique angle with the horizontal build plane 28 (or might be curved as well or in the alternative). Upper surface 26 will have a point of maximum and minimum height over which a usable article 4 (the desired product) is to be formed. A height difference between the maximum and minimum height can be referred to as H which can be more than a multiple of the slice thickness t. When manufacturing article 4, there is a need to form a number of initial "base" polymer layers over the build plate 12 before forming article 4. First, a set of N base layers 56 are formed preferably having a cumulative thickness greater than H. Thus, in the illustrated embodiment, N times t is equal to or greater than H.

The base layers 56 can have a matrix or hatched geometry that provides sufficient support for article 4 but otherwise minimizes material (photocurable resin 7) usage. For example, a rectangular hatched geometry can be used over the area that will support the article 4.

During or after forming base layers 56 a scaffold structure 58 is formed to separate the base layers 56 from the article 4 with a tapered or frangible tip 59 geometry to allow the article 4 to be easily removed from the base layers 56 and from the scaffold structure 58. After or concurrent with forming the scaffold 58, the article 4 is formed. After the article 4 is formed, the base layers 56 and scaffold are removed from the article 4 by breaking a frangible connection 59 or interface between the scaffold 58 and the article 4. The article 4 is a desired usable product of a fabrication or manufacturing process. The base layers 56 and scaffold structure 58 are solidified waste material to be discarded.

FIG. 4 depicts a relatively simple scaffold structure 58. In practice, scaffold structure 58 can have a high degree of complexity and can overlap the 3D article 4 along the vertical Z-axis. The design of the scaffold structure 58 provides geometrical and physical support for the 3D article 4.

Generally, the base layers 56 are formed to provide a planar upper surface 27 before the article 4 is formed. The scaffold 58 is for supporting article 4 and for coupling the base layers 56 to the article 4. The base layers 56 and scaffold 58 are to be discarded or recycled. The 3D article 4 is the usable product resulting from a manufacturing process. The 3D article 4 is separated from the discardable or recyclable portions 56, 58 by separation at the frangible tips 59.

The value of H can vary according to mechanical tolerances and a lateral geometry of the article 4. The build plate 12 has a large surface area and so fabricating many layers to accommodate a worst-case value for H is costly in material and time consuming. To minimize material usage and time to start fabricating article 4, system 2 has a unique way of analyzing a motion or perturbation or displacement signal that is indicative of a vertical motion of the resin upper surface 9. The signal can arrive from one or more sensors which can include the CVPS 24, the resin level sensor 8, or another sensor. In the following illustrative embodiment, the signal arrives from the compensation volume position sensor (CVPS) 24.

In various embodiments, H can vary from 1 to 10 millimeters. More typically, H can vary from about 1.5 to 6 millimeters. On the other hand, a slice thickness t can be about 100 microns which equals 0.1 millimeter. If H is 10 millimeters and t is 0.1 millimeters, a value of N would need to be at least 100—it would require 100 base layers to provide a level surface for fabricating the article 4. But when H is 1 millimeter, only 10 base layers are required.

Figure 5:
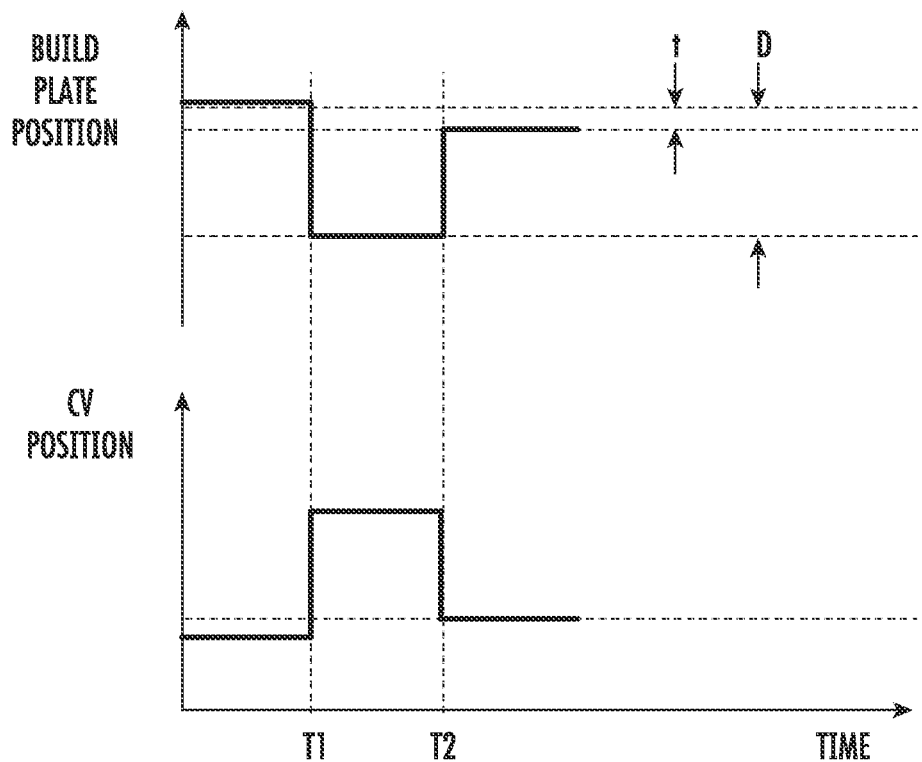
FIG. 5 is an "idealized" timing diagram depicting an embodiment of motion of a build plate and responsive motion of a compensation volume during the formation of a layer of resin to be selectively hardened. It is called idealized because a "real system" would have slopes (rather than square pulses) and a certain degree of latency (delay between input and response).

FIG. 5 is a simplified and idealized timing diagram to illustrate the signal from the CVPS 24 versus vertical motion of the build plate 12. The top graph depicts build plate 12 vertical position versus time and the bottom graph depicts compensation volume 22 vertical position versus time. At time T1, the build plate 12 moves downward by a distance D as shown in the top graph. To maintain the resin level, the compensation volume (CV) 22 moves upward to volumetrically offset the volume of the build plate 12. At time T2, the build plate 12 moves up a distance D-t in so that a slice thickness of resin remains on top of the build plate 12. As can be seen, the displacement volume 22 moves up to compensate at time T2. Note that this is idealized, because a "real system" will not have step motions but slopes near time T1 and T2 to represent finite velocities. Also, a real system will have some latency or a time lag between motion of the build plate and motion of the CV 20. FIG. 5 is idealized to reveal the concept to help understand captured data.

Figure 6A:
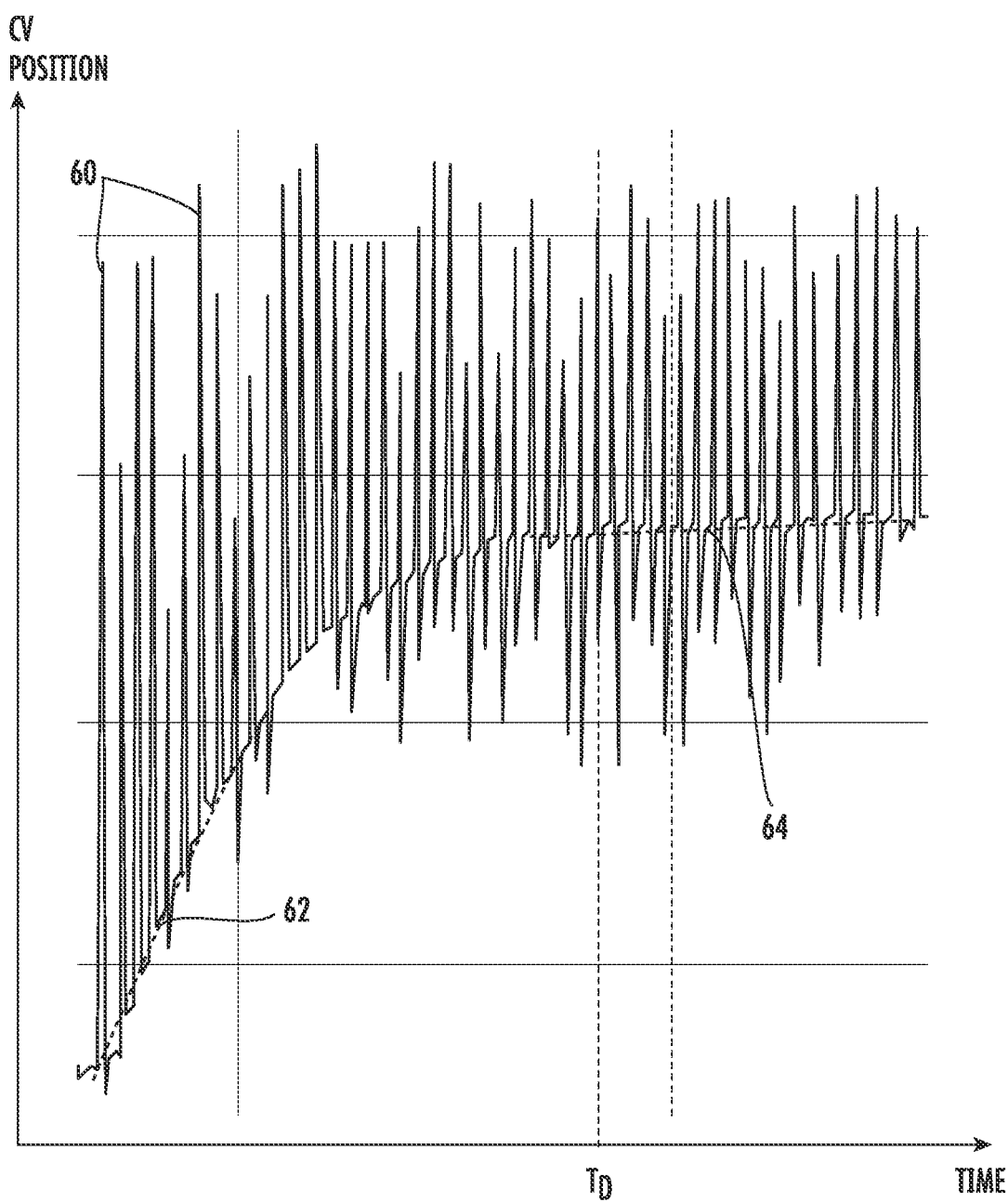
FIG. 6A depicts continuous real time motion of a compensation volume during the fabrication of an object on an upper surface of a build plate.

FIG. 6A is a plot of a signal from the CVPS 24 versus time (or polymerized layer number) while fabricating base layers 56 and possibly a start of fabricating the scaffold structure 58 and article 4. The following describes some interpretation of the graph. The horizontal axis abscissa is proportional to or equal to a number of base layers 56 that have been imaged or fabricated. The vertical axis ordinate is proportional to or equal to a vertical position of the CV 20.

Some large repeated spikes 60 in FIG. 6A represent the response to lowering the build plate 12 by a distance D below the build plane 28. After spiking upward, the displacement volume 22 then "settles out" along a defined line or curve when a portion of the upper surface 26 is raised to within a thickness of the build plane. An initial "base" part 62 of the curve slopes linearly and steeply upwardly. This represents a time period over which the base layers 56 are being formed upon the sloped upper surface 26. This is because the volume of the build plate 12 being immersed and raised increases rapidly as layers are used to form a level upper surface 27 of resin over the build plate 12.

After the level upper surface 27 is fully formed, then the effect of lowering and raising the build plate 12 is relatively constant. This defines a "build" part 64 of the curve that may slope upward gradually. During the "build" part of the curve, fabrication of the article 4 can begin without deleterious effects. The "build" part of the curve can begin after a defined time $T_D$. FIG. 6 illustrates the build part fabrication starting just a few slices after the curve flattens out. In practice, it may be preferable to form another 10 or 20 layers or more before forming the article 4.

Figure 6B:
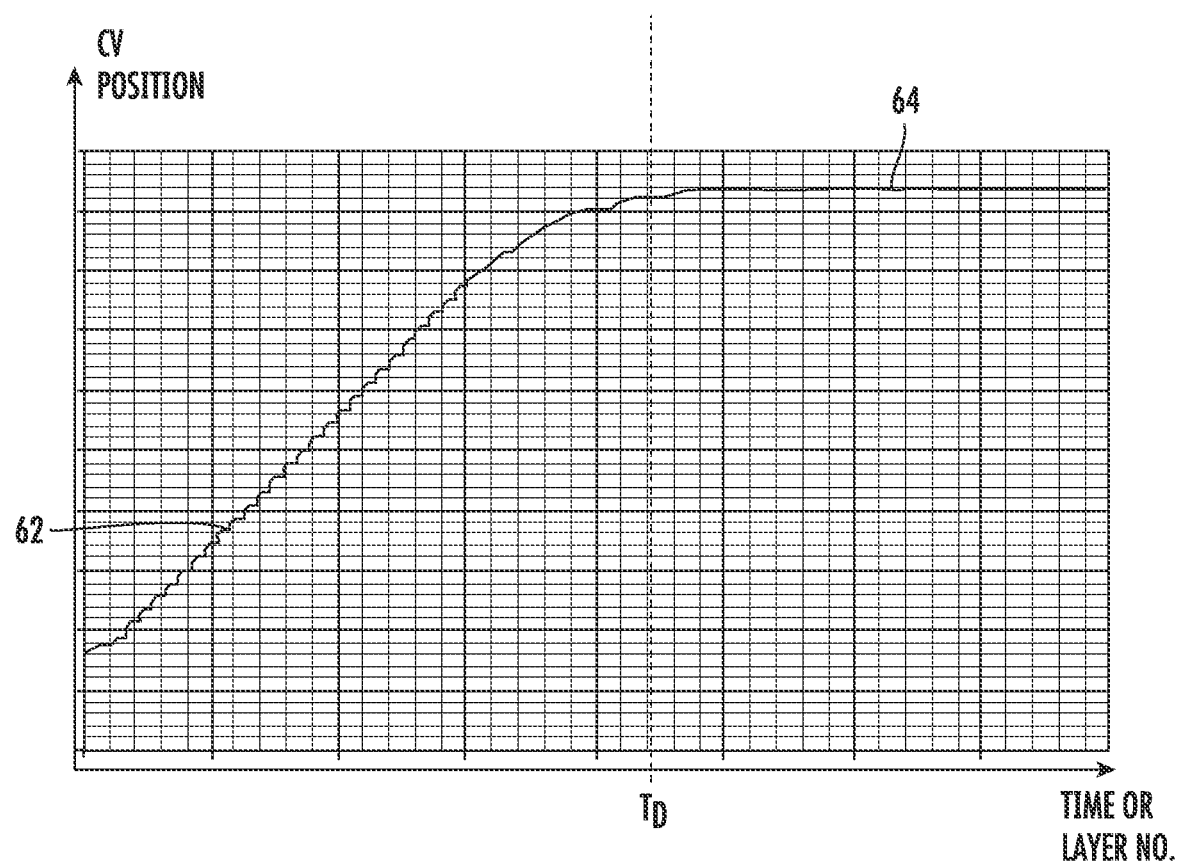
FIG. 6B depicts stepped motion of a compensation volume during the fabrication of an object on an upper surface of a build plate.

FIG. 6B is similar to FIG. 6A except that the CV 20 position data is measured when the plate upper surface 26 is positioned at the build plane 28. In other words, the big down signal motion that causes the spikes 60 is filtered out or not captured. The "base" part of the curve 62 depicts the time or layer formation during which the plate upper surface 26 is only partially submerged and the curve is proportional to an amount of additional volume of the build plate 12 that becomes submerged with an additional layer. The "build" part of the curve 64 depicts the time or layer formation during which the plate upper surface 26 is fully submerged. There is a defined time $T_D$ or layer at which the curve has flattened out enough to begin fabricating the 3D article 4.

The curve of FIG. 6B has an abscissa that is proportional to or equal to a number of base layers 56 that have been formed onto the upper surface 26 of the build plate. The ordinate is proportional to or equal to a vertical position of the CV 20. The resultant curve has a slope that can define a metric. The slope of the base part of the curve 62 has a much greater magnitude than the slope of the build part of the curve 64. When the metric/slope is found to have a magnitude below a certain threshold, this is indicative that sufficient base layers 56 have been deposited over the upper surface of the 26 to provide a level surface 27 and to allow the 3D article fabrication to begin.

Figure 7A:
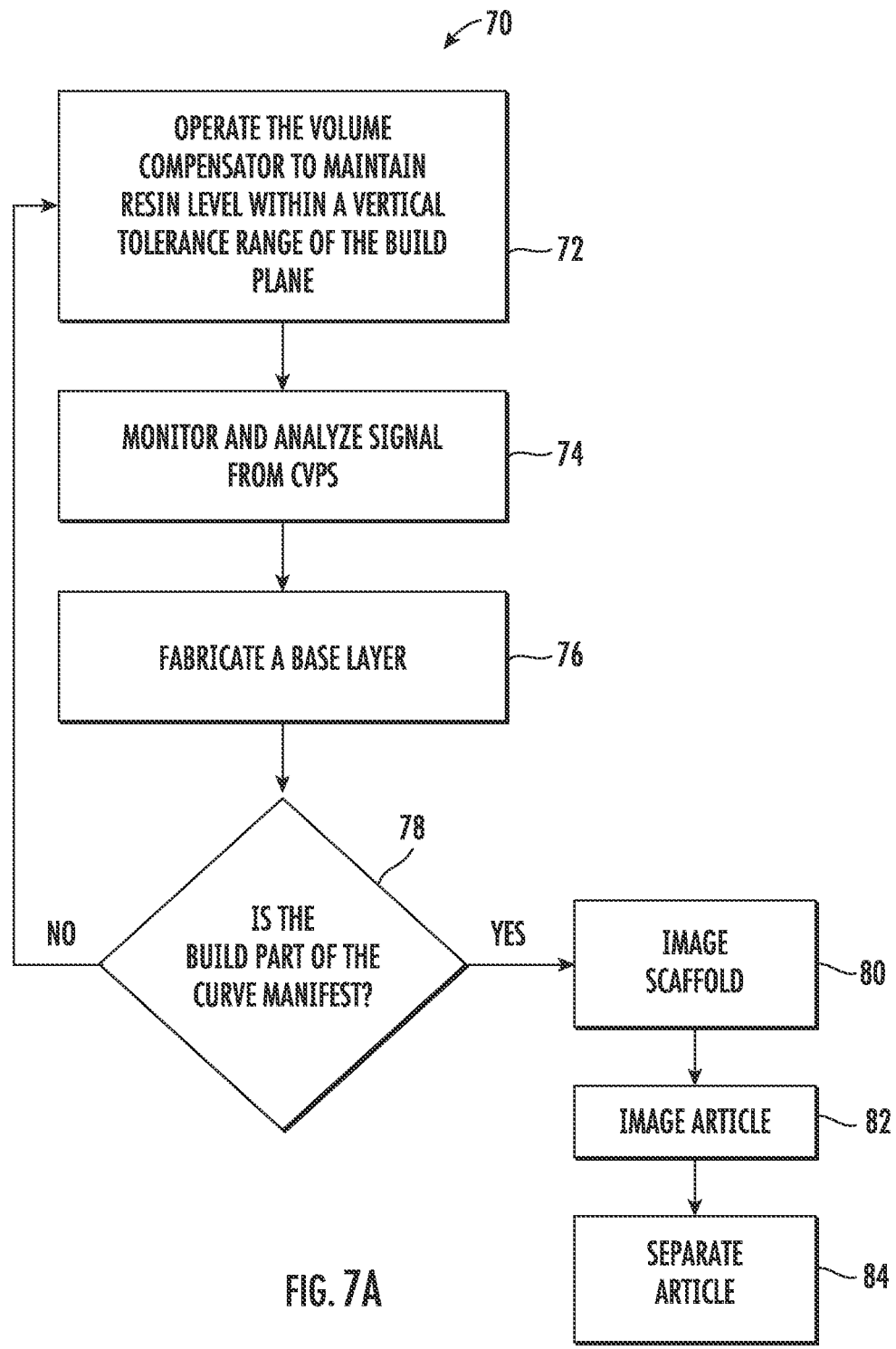
FIG. 7A is a flowchart depicting a first embodiment of a method of fabricating an object that is optimized through analysis of a signal from a compensation volume position sensor (CVPS).

FIG. 7A describes an embodiment of a method 70 of manufacturing a three-dimensional article 4. Controller 18 is configured to perform method 70.

According to 72, the volume compensator (VC) 10 is operated to maintain a fluid level of resin 7 within a vertical tolerance range of the build plane 28. Step 72 can be equivalent to method 34 of FIG. 2. Step 72 can be performed continuously during method 70 or periodically in response to motion of the build plate 12.

According to step 74, a signal is received and monitored from the CVPS 24. Additionally, the signal is periodically analyzed to determine a metric. The metric is related to an extent of immersion of the plate upper surface 26 below the resin upper surface 9. In an illustrative embodiment, the metric is a slope of the curve of CVPS 24 vertical position versus time. The slope m can be obtained using a least squares (or other) curve fit analysis. The metric or slope m can be computed for each base layer 56 fabricated or after a plurality of base layers are fabricated.

According to 76, a base layer 56 is fabricated. Fabrication of the base layer 56 can be tantamount to steps 48-54 of method 46 of FIG. 3. The base layer 56 can be a continuous sheet covering the upper surface 26 or it can be a striped, grid, or other geometric structure that provides structural support with a minimized use of resin 7.

According to 78, a determination is made as to whether a "build" part of the curve is manifest or established. This is based upon the slope of the curve of the volume compensator position versus time being less than a certain threshold for a certain amount of time. If not, then the process loops back to step 72.

If the build part of the curve is manifest, then the process moves to step 80. At step 80, formation of the scaffold structure 58 can begin. At step 82, fabrication of the article begins. In step 84, the article 4 is physically separated from the scaffold structure 58 and the base layers 56. The scaffold structure 58 couples to the article 4 via narrowed or frangible tips 59, as depicted in FIG. 4. Step 84 involves physically breaking the connection between the narrowed tips 59 and the article 4. The coupling between the narrowed tips 59 and the article 4 is frangible or selectively breakable.

In one embodiment, step 80 includes a fabrication of M additional base layers 56 before starting fabrication of the scaffold. M can vary, but is selected to assure that the base layers 56 will extend laterally to support the 3D article 4. This will assure that a planar upper surface 27 will have a lateral extent that at least spans the lateral extent of the scaffold 58 and/or the 3D article 4.

Figure 7B:
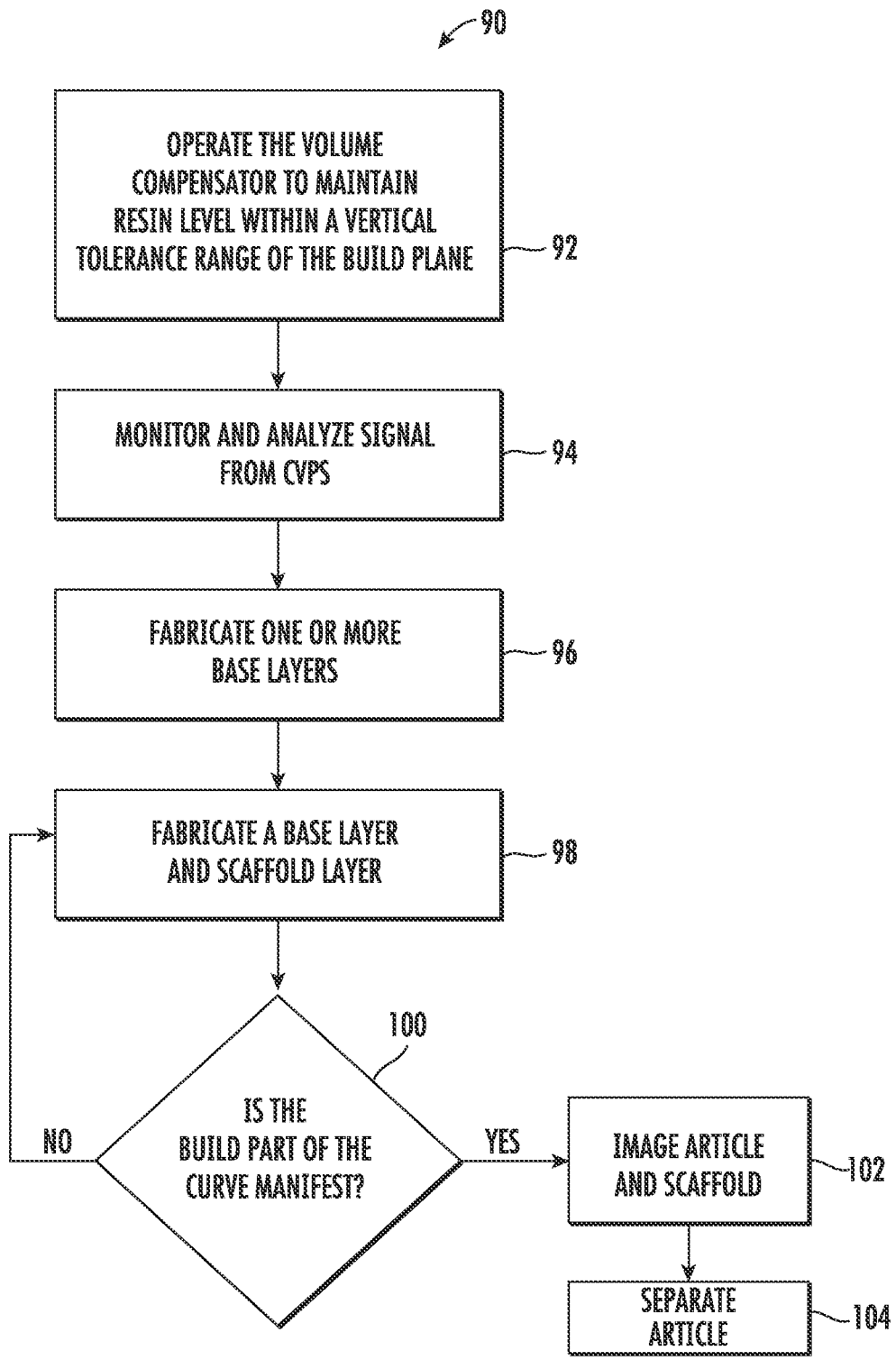
FIG. 7B is a flowchart depicting a second embodiment of a method of fabricating an object that is optimized through analysis of a signal from a compensation volume position sensor (CVPS).

FIG. 7B depicts an alternative embodiment of a method 90 of manufacturing a three-dimensional article 4. Steps 92 and 94 of method 90 are similar to steps 72 and 74 of method 70 and share the same description.

In step 96, plurality of base layers are fabricated. In step 98, formation of the scaffold structure 58 begins while base layers are still being fabricated.

In step 100, a determination is made as to whether a "build" part of the curve is manifest or established. This is based upon the slope of the curve of the volume compensator position versus time being less than a certain threshold for a certain amount of time. If not, then the process loops back to step 98.

If the build part of the curve is manifest, then the process moves to step 102. During step 102, remaining layers of the scaffold structure 58 and all of article 4 are fabricated. According to step 104, the article 4 is physically separated from the scaffold structure 58 and the base layers 56. Step 104 is similar to that of step 84.

In one embodiment, step 102 includes a fabrication of M additional base layers 56 before starting fabrication of the scaffold structure 58 and/or article 4. M can vary, but is selected to assure that the base layers 56 will extend laterally to support the 3D article 4. This will assure that a planar upper surface 27 will have a lateral extent that at least spans the lateral extent of the scaffold 58 and/or the 3D article 4.

The specific embodiments and applications thereof described above are for illustrative purposes only and do not preclude modifications and variations encompassed by the scope of the following claims.

What is claimed:

1. A three-dimensional (3D) printing system for manufacturing a three-dimensional (3D) article comprising:
    a resin vessel for containing a volume of resin having a resin upper surface;
    an imaging system configured to selectively cure a layer of the resin over a build plane;
    a build plate having a plate upper surface that defines a vertical height difference H over which the 3D article is to be fabricated due to curvature and/or defining an oblique angle of the plate upper surface relative to the horizontal build plane;
    a vertical positioner;
    a resin level sensor;
    a volume compensator (VC); and
    a controller configured to:
        operate the VC to maintain the resin upper surface coincident to the build plane to within a specified vertical tolerance range;
        operate the imaging system and the vertical positioner to generate a plurality of base layers upon the plate upper surface;
        receive a first signal responsive to vertical motion of the resin upper surface;
        while forming the plurality of base layers, analyze the first signal to determine a slope of a volume compensation versus time curve having an initial base part of the curve having an initial slope indicative of forming layers over an angled and/or curved surface and a build part of the curve having a slope that is of lower magnitude than the initial slope indicative of forming layers over a horizontal planar surface; and
        operate the imaging system and the vertical positioner to begin generation of the 3D article after the slope has decreased below a predefined threshold at which the plurality of base layers have compensated for the vertical height difference H and have covered the angled and/or curved surface and define a horizontal plane over which the 3D article is generated.

2. The three-dimensional (3D) printing system of claim 1 wherein the controller is further configured to generate frangible features that allow physical breakage between the 3D article and the base layers.

3. The three-dimensional (3D) printing system of claim 2 wherein the controller is further configured to generate a support scaffold that couples the frangible features to the base layers.

4. The three-dimensional (3D) printing system of claim 1 wherein the VC includes:
   a compensation volume (CV);
   a compensation volume positioner (CVP); and
   a compensation volume position sensor (CVPS) that outputs a position signal indicative of a vertical position of the CVP, the first signal is the position signal from the CVPS.

5. The three-dimensional (3D) printing system of claim 4 wherein the metric is a slope of a curve of the position of the CV versus layer, generation of the 3D article begins after the slope is below a certain threshold.

6. The three-dimensional (3D) printing system of claim 4 wherein operating the VC includes:
   (a) analyzing the signal from the resin level sensor to determine whether the resin upper surface is above or below the tolerance range;
   (b) if the resin upper surface is above the tolerance range, operating the CVP to raise the CV to lower the resin upper surface toward to within the tolerance range;
   (c) if the resin upper surface is below the tolerance range, operating the CVP to lower the CV to raise the resin upper surface toward to within the tolerance range; and
   (d) repeat (a)-(c).

7. The three-dimensional (3D) printing system of claim 1 wherein generating the base layers includes the steps of:
   (a) operating the vertical positioner to position the plate upper surface or cured resin upper surface at a distance D below the build plane, the distance D equals at least two times t, t equals a single slice thickness;
   (b) operating the vertical positioner to position the plate upper surface at a distance t below the build plane;
   (c) operating a planarizing module to planarize a thickness of a layer of uncured resin to a thickness t;
   (d) operate the imaging system to selectively harden the layer of uncured resin; and
   (e) repeat (a)-(d) until ceasing generation of the base layers.

8. The three-dimensional (3D) printing system of claim 1 wherein generating the layers defining the support scaffold and the 3D article includes:
   (a) operating the vertical positioner to position the plate upper surface at a distance t below the build plane;
   (b) operating a planarizing module to reduce a thickness of a layer of uncured resin to a thickness generally equal to t;
   (c) operate the imaging system to selectively harden the layer of uncured resin; and
   (d) repeat (a)-(c) until ceasing generation of the base layers.

9. A method of manufacturing a three-dimensional (3D) article, the method performed by a controller configured to operate a 3D printing system, the 3D printing system including:
   a resin vessel for containing a volume of resin having a resin upper surface;
   an imaging system configured to selectively cure a layer of the resin over a build plane;
   a build plate having a plate upper surface that defines a vertical height difference H over which the 3D article is to be fabricated due to curvature and/or defining an oblique angle of the plate upper surface relative to the horizontal build plane;
   a vertical positioner;
   a resin level sensor; and
   a volume compensator (VC); and
   the method comprising:
      monitoring the resin level sensor and operating the volume compensator (VC) to maintain the resin upper surface coincident to a build plane within a specified vertical tolerance range;
      operating a vertical positioner and an imaging system to generate a plurality of base layers upon a plate upper surface;
      receiving a first signal responsive to vertical motion of the resin upper surface;
      while forming the plurality of base layers, analyzing the first signal to determine a slope of a volume compensation versus time curve having an initial base part of the curve having an initial slope indicative of forming layers over an angled and/or curved surface and a build part of the curve having a slope that is of lower magnitude than the initial slope indicative of forming layers over a horizontal planar surface; and
      operating the imaging system and the vertical positioner to begin generation of the 3D article after the slope has decreased below a threshold at which the plurality of base layers have compensated for the vertical height difference H and have covered the angled and/or curved surface and define a horizontal plane over which the 3D article is generated.

10. The method of claim 9 further comprising generating frangible features that allow physical breakage between the 3D article and the base layers.

11. The method of claim 10 further comprising generating a support scaffold that couples the frangible features to the base layers.

12. The method of claim 9 wherein the VC includes:
   a compensation volume (CV);
   a compensation volume positioner (CVP); and
   a compensation volume position sensor (CVPS) that outputs a position signal indicative of a vertical position of the CVP, the first signal is the position signal from the CVPS.

13. The method of claim 12 wherein the metric is a slope of a curve of the position of the CV versus layer, generation of the 3D article begins after the slope is below a certain threshold.

14. The method of claim 12 wherein operating the VC includes:
   (a) analyzing the signal from the resin level sensor to determine whether the resin upper surface is above or below the tolerance range;
   (b) if the resin upper surface is above the tolerance range, operating the CVP to raise the CV to lower the resin upper surface toward to within the tolerance range;
   (c) if the resin upper surface is below the tolerance range, operating the CVP to lower the CV to raise the resin upper surface toward to within the tolerance range; and
   (d) repeat (a)-(c).

15. The method of claim 9 wherein generating the base layers includes:
   (a) operating the vertical positioner to position the plate upper surface or cured resin upper surface at a distance D below the build plane, the distance D equals at least two times t, t equals a single slice thickness;

(b) operating the vertical positioner to position the plate upper surface at a distance generally equal to t below the build plane;
(c) operating a planarizing module to reduce a thickness of a layer of uncured resin to a thickness generally equal to t;
(d) operate the imaging system to selectively harden the layer of uncured resin; and
(e) repeat (a)-(d) until ceasing generation of the base layers.

16. The method of claim 9 wherein generating the layers defining the support scaffold and the 3D article include:
(a) operating the vertical positioner to position the plate upper surface at a distance t below the build plane;
(b) operating a planarizing module to reduce a thickness of a layer of uncured resin to a thickness generally equal to t;
(c) operate the imaging system to selectively harden the layer of uncured resin; and
(d) repeat (a)-(c) until ceasing generation of the base layers.

17. A non-transient storage media storing software instructions, that when executed by a processor, operate a 3D printing system to fabricate a 3D article, the 3D printing system including:
a resin vessel for containing a volume of resin having a resin upper surface;
an imaging system configured to selectively cure a layer of the resin over a build plane;
a build plate having a plate upper surface that defines a vertical height difference H over which the 3D article is to be fabricated due to curvature and/or defining an oblique angle of the plate upper surface relative to the horizontal build plane;
a vertical positioner;
a resin level sensor; and
a volume compensator (VC); and
when executed by the processor, the software instructions perform the following steps:
monitoring the resin level sensor and operate the volume compensator (VC) to maintain a resin upper surface coincident to the build plane within a specified vertical tolerance range;
operating the vertical positioner and the imaging system to generate a plurality of base layers upon the plate upper surface;
receiving a first signal responsive to vertical motion of the resin upper surface;
while forming the plurality of base layers, analyzing the first signal to determine slope of a volume compensation versus time curve having an initial base part of the curve having an initial slope indicative of forming layers over an angled and/or curved surface and a build part of the curve having a slope that is of lower magnitude than the initial slope indicative of forming layers over a horizontal planar surface; and
operating the imaging system and the vertical positioner to begin generation of the 3D article after the slope has decreased below a threshold at which the plurality of base layers have compensated for the vertical height difference H and have covered the angled and/or curved surface and define a horizontal plane over which the 3D article is generated.

18. The non-transient storage media of claim 17 wherein the steps further include generating frangible features that allow physical breakage between the 3D article and the base layers.

19. The non-transient storage media of claim 18 wherein the steps further include generating a support scaffold that couples the frangible features to the base layers.

20. The non-transient storage media of claim 17 wherein the VC includes:
a compensation volume (CV);
a compensation volume positioner (CVP); and
a compensation volume position sensor (CVPS) that outputs a position signal indicative of a vertical position of the CVP, the first signal is the position signal from the CVPS.

21. The non-transient storage media of claim 20 the metric is a slope of a curve of the position of the CV versus layer, generation of the 3D article begins after the slope is below a certain threshold.

* * * * *